Figure 1:
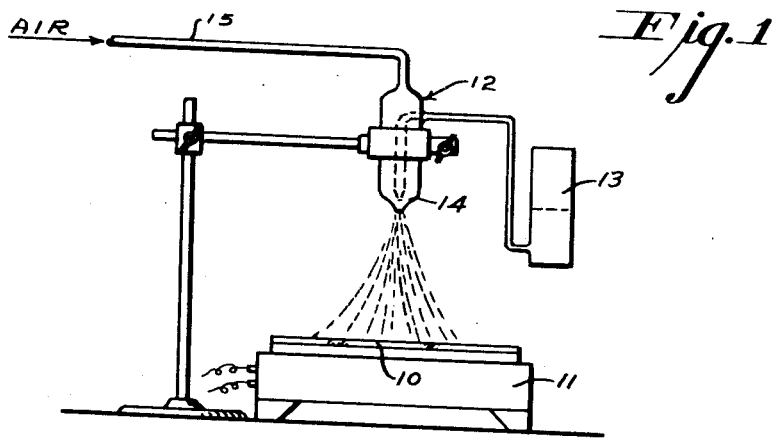

Aug. 21, 1951

J. K. DAVIS 2,564,677

ELECTRICALLY CONDUCTING COATING ON
GLASS AND OTHER CERAMIC BODIES

Filed Sept. 15, 1947

IRIDIZED OXIDE COATING

SUPERPOSED IRIDIZED
OXIDE COATING

GLASS PLATE

Inventor
JAMES K. DAVIS

By
F. H. Knight
Attorney

Patented Aug. 21, 1951

2,564,677

UNITED STATES PATENT OFFICE 2,564,677

ELECTRICALLY CONDUCTING COATING ON GLASS AND OTHER CERAMIC BODIES

James K. Davis, Corning, N. Y., assignor to Corning Glass Works, Corning, N. Y., a corporation of New York Application September 15, 1947, Serial No. 773,992

6 Claims. (Cl. 201—73)

1

This invention relates to electric heating devices and others comprising a base member of glass or other ceramic body provided with a heating element comprising an electrically conducting coating of the kind known generally as iridized coatings. When glass or other vitreous ceramic body is heated and contacted with certain metal salts either in the form of fumes or atomized solutions thereof, a strongly adherent layer comprising an oxide of the metal is formed on its surface. This process is known as iridizing, because the coatings thus produced are frequently iridescent due to interference of light waves reflected from the extremely thin films with those reflected from the glass.

The application of iridizing to glass for the production of beautiful artware is quite old, and for this purpose salts of tin and of iron are employed. Recently it has been found that iridized coatings comprising certain combinations of oxides of cadmium, indium, tin, and antimony have sufficiently low electrical resistivities to permit their use as electrical conductors for electric heating devices, particularly when deposited on a transparent glass supporting member, as described in application Serial No. 771,859, filed on September 3, 1947, by John M. Mochel.

Insofar as it has been possible to determine by chemical and X-ray analyses, the iridized coatings, which are mentioned above, are composed of metal oxides. Consequently, they will hereinafter be referred to as being composed of oxides, although the fact that some of the coatings are electrically conducting raises a doubt that such a definition is sufficiently exact. In modern theory the electrical conductivity of oxides is ascribed to non-uniformities in their lattice structure resulting from a departure from the stoichiometric proportions of their constituents. In other words, the constituents of an electrically conducting oxide theoretically may be present in somewhat smaller or greater, and thus far indeterminate, proportions than would correspond to its stoichiometric composition. In view of such uncertainty and in the absence of a more exact term by which to define the iridized coatings of this invention, they are hereinafter referred to as "iridized" or "oxide" coatings, it being understood that the future determination of a proper definition for such coatings shall not in any way change the scope of the claims hereunto appended.

It has been found that when such a conducting coating is deposited on one side of a glass plate and an electric current is passed through

2 the coating for the development of heat, the amount of radiant heat which is emitted from the coated side of the plate, that is, the outer face of the coating is less than the amount which is emitted from the other or uncoated side of the glass plate. Although such difference in emission is advantageous for some purposes, as is pointed out in the Mochel application above referred to, it is desirable in some circumstances that the emission from both sides of the glass plate be equal or more nearly so.

The primary object of this invention is to increase the emission of radiant heat from the outer face of an electrically conducting oxide coating on a ceramic body when the coating is heated by an electric current passed therethrough.

Another object is to equalize the emission of radiant heat from both faces of an electrically conducting oxide coating on glass when the coating is heated by an electric current passed therethrough.

A further object is to protect an iridized oxide coating on a ceramic base against atmospheric influences.

Still another object is to stabilize the electrical resistance of a conducting iridized oxide coating on a ceramic base.

Another object is to electrically insulate an electrically conducting oxide coating on a ceramic base member without altering the electrical resistivity of the conducting coating.

Figure 2:
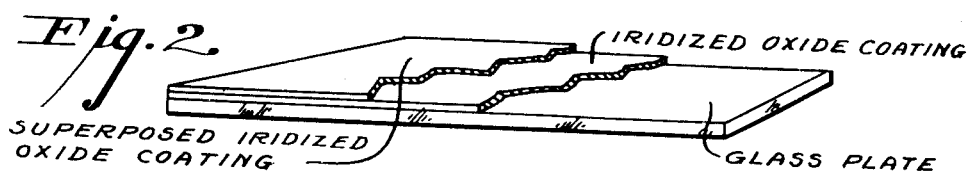
Figure 3:
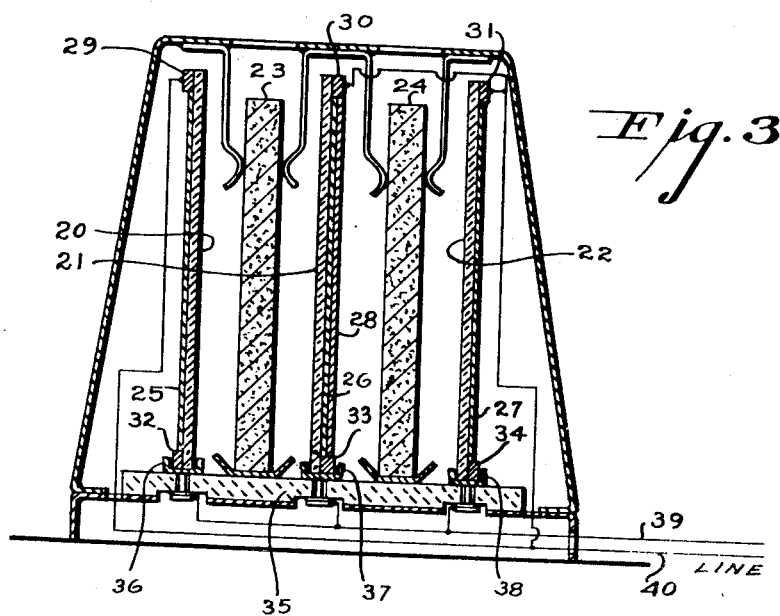

To these and other ends the invention includes the article comprising a ceramic supporting member provided with a conducting oxide coating and a superposed oxide coating of different composition and higher electrical resistance than the first coating, to be hereinafter more fully described and illustrated in the accompanying drawing in which:

Fig. 1 is an elevation of an apparatus for depositing oxide coatings on a glass sheet in accordance with the invention;

Fig. 2 is a view in perspective of a glass plate provided with oxide coatings in accordance with my invention but partly broken away for convenience in viewing and greatly exaggerated in thickness, and Fig. 3 is a vertical diagrammatic section of an electrically heated device for toasting bread, comprising an electrically heated glass element provided with iridized oxide coatings, greatly exaggerated, made in accordance with my invention.

I have found that if an electrically conducting iridized coating suitable for generating heat, that is, one having an electrical resistance of less than 1000 and preferably less than say 500 ohms per square, be covered with a superposed iridized oxide coating of different composition and higher resistance, there will be an increase in the amount of heat which is radiated from the outer face of the conducting coating when the latter is heated by the passage of an electric current therethrough. I have also found that such a superposed iridized oxide coating has other functions and advantages. For example, certain atmospheric influences, such as humidity, cause fluctuations in the resistance of a conducting iridized oxide coating which a superposed coating of higher resistance appears to prevent. A superposed iridized coating may also function to insulate a conducting undercoating or to shield the latter against abrasion.

The iridized oxide films of this invention may be formed on the surface of a glass article such as a glass plate. Referring to Fig. 1, a glass plate 10 is heated uniformly on an electric hot plate 11. An atomizer, generally designated 12 and preferably composed of glass, comprises a cup 13 for containing the solution of salts to be atomized, an atomizing nozzle 14 and a tube 15 for the introduction of compressed air to the nozzle. The atomizer is so supported that the nozzle 14 is about one foot above the glass plate.

By means of the hot plate 11, the glass plate 10 is heated to a temperature above 500° C., preferably to 650° C., and the solution in the cup 13 is atomized as a fine mist on to the heated plate 10 by passing air through the tube 15 for about 10 to 20 seconds. The metal salts are decomposed by hydrolysis and heat to form a thin strongly-adherent film of the corresponding metal oxides on the surface of the glass.

The thickness of the oxide film may be gauged by the apparent color of the film caused by interference of light waves reflected therefrom. As the thickness of the film increases, its apparent color changes and the order or succession of the colors with increasing thickness is analogous to that of the well-known Newton rings described in "A Treatise on Light," by R. A. Houstoun, Longmans, Green & Co., Ltd., (1938) page 147. Since red marks the end of each order, this color is preferably employed as the distinguishing mark of the successive orders and, for present purposes, is assigned a wave length of 6200 angstroms. Calculation shows that the approximate film thickness in angstroms for the various orders of red is approximately:

| Order | Angstroms |
| --- | --- |
| 1 | 775 |
| 2 | 2,320 |
| 3 | 3,870 |
| 4 | 5,420 |
| 5 | 6,970 |

For convenience, the resistance in ohms of a square film of third order red is herein arbitrarily employed as the unit of specific resistance of the films herein described, and in order to avoid confusion is designated "standard resistance" or "S. R." The resistivity may be calculated by multiplying the "standard resistance" by the thickness in centimeters of a third order red film $(3870 \times 10^{-8}$ cm.).

For present purposes another coating of higher resistance is deposited over the first coating, as shown in Fig. 2, by iridization as described above, using a different solution of a suitable metal salt or mixture of salts to be hereinafter described. The superposed coating may be deposited immediately after the formation of the first coating and before the glass has cooled, or may be deposited after any desired interval of time, the glass being reheated and treated as before.

As pointed out above iridized oxide coatings comprising certain combinations of oxides of cadmium, indium, tin, and antimony are electrically conducting. These metals have atomic weights ranging from about 112 to about 122 and are numbered from 48 to 51 respectively in the periodic system of elements. For making conducting coatings, they preferably are combined thus: tin oxide with antimony oxide, or tin oxide with indium oxide, or cadmium oxide with indium oxide. Other metal oxides, such as oxides of zinc, copper, iron, manganese, cobalt, vanadium, etc., may be added in small amounts, not exceeding say about 20%, to the conducting compositions of tin oxide and antimony oxide, or tin oxide and indium oxide, for the purpose of modifying their properties. Tin oxide alone is also effective in forming electrically conducting coatings for purposes within the scope of this invention. To a lesser extent cadmium oxide alone and indium oxide alone also are effective, but antimony oxide alone forms a non-conducting coating. The combinations consisting of tin oxide and cadmium oxide, or cadmium oxide and antimony oxide, or antimony oxide and indium oxide, form coatings which have too high resistances for electrical heating purposes.

The superposed coatings of this invention should have higher electrical resistances than the under coatings. In some proportions the oxides of tin and antimony form high resistance coatings which radiate heat so efficiently that they are particularly suitable for present purposes. Other metal oxides per se may also be used to form high resistance superposed coatings.

For the purpose of this invention, the use of coatings containing oxides of tin and antimony is preferable both for undercoatings and for superposed coatings because, when the tin oxide content is high, they produce conducting coatings of lower electrical resistance and higher electrical stability than other oxides and, when the antimony oxide content is high, they produce high resistance coatings having particularly high heat emissivity.

The following compositions are examples, but not limitations, of solutions which can be used to produce conducting coatings and superposed coatings for increasing the heat emission of the conducting coatings, and for other purposes in accordance with the invention:

TABLE I

Compositions for conducting coatings, expressed in grams and cubic centimeters

|  | 1 | 2 | 3 | 4 | 5 | 6 | 7 | 8 | 9 | 10 | 11 |
| --- | --- | --- | --- | --- | --- | --- | --- | --- | --- | --- | --- |
| $SnCl_4 \cdot 5H_2O$ | 100 | 100 | 100 | 100 | 100 | 100 | 3 | .28 | | | |
| $SbCl_3$ | .0625 | 1 | 1 | 1.5 | 2 | 4 | | | | | |
| $MnCl_2 \cdot 4H_2O$ | | | 8 | | | | | | | | |
| $V_2O_5$ | | | | 1 | | | | | | | |
| $CoCl_2 \cdot 6H_2O$ | | | | | 8 | | | | | | |
| $ZnCl_2$ | | | | | | 1 | | | | | |
| $InCl_3$ | | | | | | | 10 | 5.1 | .4 | 5.3 | |
| $CdCl_2 \cdot 2H_2O$ | | | | | | | | .11 | | | |
| $Cd(NO_3)_2 \cdot 4H_2O$ | | | | | | | | | 10 | | 10 |
| $H_2O$ cc | 50 | 50 | 50 | 50 | 50 | 50 | 8 | 8 | 10 | 8 | 10 |
| HCl cc | 10 | 10 | 10 | 10 | 10 | 10 | 2 | 2 | | 2 | |

TABLE II

*Compositions for superposed coatings, expressed in grams and cubic centimeters*

|  | 12 | 13 | 14 | 15 | 16 | 17 | 18 |
|---|---|---|---|---|---|---|---|
| $SnCl_4 \cdot 5H_2O$ | 96 | 90 | 67 | ---- | 100 | 100 | 100 |
| $SbCl_3$ | ---- | 10 | 33 | ---- | ---- | ---- | 100 |
| $ZnCl_2$ | 4 | 10 | ---- | ---- | ---- | ---- | ---- |
| $FeCl_3 \cdot 6H_2O$ | ---- | ---- | ---- | 100 | ---- | ---- | ---- |
| $CuCl_2$ | ---- | ---- | ---- | ---- | 5 | ---- | ---- |
| $CrCl_3$ | ---- | ---- | ---- | ---- | ---- | 5 | ---- |
| $H_2O$ cc | 40 | 40 | 50 | 50 | 50 | 50 | 100 |
| HCl cc | 20 | 20 | 30 | 10 | 10 | 10 | 50 |

In lieu of the salts recited in Tables I and II, other equivalent soluble salts may be employed, for example, stannous chloride, antimony pentachloride, etc. The percentages of the corresponding oxides in the above solutions are as follows:

TABLE III

*Conducting coatings*

|  | 1 | 2 | 3 | 4 | 5 | 6 | 7 | 8 | 9 | 10 | 11 |
|---|---|---|---|---|---|---|---|---|---|---|---|
| $SnO_2$ | 99.9 | 98.5 | 91.3 | 95.7 | 91.4 | 93 | 7.4 | 3.6 | ---- | ---- | ---- |
| $Sb_2O_3$ | .1 | 1.5 | 1.3 | 2.1 | 2.7 | 5.5 | ---- | ---- | ---- | ---- | ---- |
| $MnO_2$ | ---- | ---- | 7.4 | ---- | ---- | ---- | ---- | ---- | ---- | ---- | ---- |
| $V_2O_5$ | ---- | ---- | ---- | 2.2 | ---- | ---- | ---- | ---- | ---- | ---- | ---- |
| $Co_2O_3$ | ---- | ---- | ---- | ---- | 5.9 | ---- | ---- | ---- | ---- | ---- | ---- |
| ZnO | ---- | ---- | ---- | ---- | ---- | 1.5 | ---- | ---- | ---- | ---- | ---- |
| $In_2O_3$ | ---- | ---- | ---- | ---- | ---- | ---- | 92.6 | 94.6 | 5.4 | 100 | ---- |
| CdO | ---- | ---- | ---- | ---- | ---- | ---- | ---- | 1.8 | 94.6 | ---- | 100 |
| S. R. Ohms | 43 | 17 | 55 | 73 | 55 | 32 | 28 | 30 | 73 | 675 | 90 |

TABLE IV

*Superposed coatings*

|  | 12 | 13 | 14 | 15 | 16 | 17 | 18 |
|---|---|---|---|---|---|---|---|
| $SnO_2$ | 94.5 | 76 | 58 | ---- | 93.5 | 94.7 | 40 |
| $Sb_2O_3$ | ---- | 12.5 | 42 | ---- | ---- | ---- | 60 |
| ZnO | 5.5 | 11.5 | ---- | ---- | ---- | ---- | ---- |
| $Fe_2O_3$ | ---- | ---- | ---- | 100 | ---- | ---- | ---- |
| CuO | ---- | ---- | ---- | ---- | 6.5 | ---- | ---- |
| $Cr_2O_3$ | ---- | ---- | ---- | ---- | ---- | 5.3 | ---- |
| Per Cent Emission | 70 | 79 | 82 | 81 | 74 | 87 | 88 |

The above compositions and many others, which are too numerous to be here set forth but which are disclosed in the above-entitled application or known to the art, may be applied to glass or other ceramic articles by the above-described method. When one of the above or other conducting coatings is deposited upon a glass plate and heated to 350° C. by the passage of sufficient electric current therethrough, the amount of heat which is radiated from the film side is considerably less than the amount which is radiated from the glass side. In some cases the emission ratio, or ratio of film radiation to glass radiation, may be less than .5 or 50%. For example, a film about 4000 angstroms thick of composition 6 has an emission ratio of 50%, and one of composition 2 has an emission ratio of 35%.

The "% Emission," recited in Table IV for compositions 12 to 18 inclusive, is the emission ratio which results when coatings from 1000 to 4000 angstroms thick of these compositions are superposed on a coating formed from composition 6. It will be noted that the increase in heat emission over that of composition 6 alone is quite substantial.

In general, the electrical resistance of compositions 12 to 18 inclusive is higher than the resistance of compositions 1 to 11. In selecting a composition for superposition over a conducting coating for increasing the emission thereof, it is necessary to use one having a higher resistance than the coating over which it is to be superposed. The use of such superposed coatings also results in protection of the conducting coating against atmospheric influences and causes an improvement in its electrical stability. Other compositions having the proper relative resistances may be used in lieu of those given above.

To illustrate electric heating devices made in accordance with my invention, reference is had to Fig. 3 which represents diagrammatically an electric bread toaster comprising three parallel glass plates 20, 21, and 22, and two slices of bread to be toasted 23 and 24 which are placed one on each side of the centrally located plate 21 and parallel therewith. The glass plates are provided with iridized electrically conducting oxide coatings 25, 26, and 27 respectively, and the centrally located plate 21 is additionally provided with a superposed oxide coating 28, all of the coatings being greatly exaggerated in thickness for convenience in viewing. The glass plates 20, 21, and 22 are further provided along their upper edges with metal strips 29, 30, and 31 respectively, and along their lower edges with metal strips 32, 33, and 34 respectively. The metal strips 29 through 34 are integral with the respective glass plates and are in electrical contact with the conducting oxide coatings thereon. The glass plates 20, 21, and 22 and the bread slices 23 and 24 are supported in a vertical position on a dielectric base 35 having clips 36, 37, and 38 which are in electrical contact with the lower metal strips 32, 33, and 34 respectively. The clips 36, 37, and 38 are electrically connected with a wire 39, and the upper metal strips 29, 30, and 31 are electrically connected to a wire 40. The wires 39 and 40 form a circuit with a source of electric current (not shown). Any known device (not shown) for removing the bread and interrupting the flow of current either by manual or automatic means may be employed.

When about 11 watts per square inch at 110 volts is passed through the conducting coatings 25, 26, and 27, the coatings are heated to about 350° C. From the plates 20 and 22 more radiant heat is emitted from their uncoated faces than from their coated faces, and the uncoated face of each plate is therefore turned toward the adjacent slice of bread. On the other hand, the centrally located glass plate 21, by virtue of the superposed coating 28, emits substantially as much radiant heat from its coated face as from its uncoated face, and the slices of bread 23 and 24 are substantially equally affected thereby.

Other arrangements of the various parts of the device and modifications thereof for other purposes will be apparent to those skilled in the art and are included within the scope of the invention as claimed.

I claim:

1. An electric heating device which comprises a vitreous ceramic body having on a surface thereof an electrically conducting iridized metal oxide film integrally united with such surface and having an electrical resistance of less than 1000 ohms per square and, superposed on said film and integrally united therewith, a second iridized metal oxide film having a different composition and a higher electrical resistance than the first film, said body being provided with spaced metallic members in electrical contact with the film integrally united with the surface of such body.

2. An electric heating device which comprises a vitreous ceramic body having on a surface thereof an electrically conducting iridized metal oxide film comprising an oxide of tin and an oxide of antimony integrally united with such surface and having an electrical resistance of less than 1000 ohms per square and, superposed on said film and integrally united therewith a second iridized metal oxide film having a different composition and a higher electrical resistance than the first film, said body being provided with spaced metallic members in electrical contact with the film integrally united with the surface of such body.

3. An electric heating device which comprises a vitreous ceramic body having on a surface thereof an electrically conducting iridized metal oxide film comprising an oxide of indium and an oxide of tin integrally united with such surface and having an electrical resistance of less than 1000 ohms per square and, superposed on said film and integrally united therewith a second iridized metal oxide film having a different composition and a higher electrical resistance than the first film, said body being provided with spaced metallic members in electrical contact with the film integrally united with the surface of such body.

4. An electric heating device which comprises a vitreous ceramic body having on a surface thereof an electrically conducting iridized metal oxide film comprising an oxide of cadmium and an oxide of indium integrally united with such surface and having an electrical resistance of less than 1000 ohms per square and, superposed on said film and integrally united therewith a second iridized metal oxide film having a different composition and a higher electrical resistance than the first film, said body being provided with spaced metallic members in electrical contact with the film integrally united with the surface of such body.

5. An electric heating device as claimed in claim 1, in which the film integrally united with the surface of the body consists of an oxide of tin, an oxide of antimony, and not over 20% ZnO.

6. An electric heating device as claimed in claim 1, in which the film integrally united with the surface of the body consists of about 93% $SnO_2$, 5.5% $Sb_2O_3$, and 1.5% ZnO, and the superposed film consists of about 76% $SnO_2$, 12.5% $Sb_2O_3$, and 11.5% ZnO.

JAMES K. DAVIS.

REFERENCES CITED

The following references are of record in the file of this patent:

UNITED STATES PATENTS

| Number | Name | Date |
| --- | --- | --- |
| 1,954,832 | Ruben | Apr. 17, 1934 |
| 2,026,086 | Farncomb | Dec. 31, 1935 |
| 2,118,795 | Littleton | May 24, 1938 |
| 2,194,189 | Wheeler | Mar. 19, 1940 |
| 2,244,777 | Hood | June 10, 1941 |
| 2,429,420 | McMaster | Oct. 21, 1947 |
| 2,467,144 | Mochel | Apr. 12, 1949 |

FOREIGN PATENTS

| Number | Country | Date |
| --- | --- | --- |
| 101,011 | Australia | May 20, 1937 |
| 577,748 | Great Britain | May 30, 1946 |